United States Patent [19]

Young

[11] Patent Number: 5,076,504

[45] Date of Patent: Dec. 31, 1991

[54] POULTRY PULVERIZER

[75] Inventor: Galen F. Young, Delmar, Del.

[73] Assignee: Animal Health Sales, Del.

[21] Appl. No.: 531,048

[22] Filed: May 31, 1990

[51] Int. Cl.⁵ .............................................. B02C 18/12
[52] U.S. Cl. ........................................ 241/92; 241/55;
241/101.7; 241/224; 241/239; 241/242;
241/286
[58] Field of Search .................. 241/101.7, 55, 92, 286,
241/285 R, 285 A, 224, 239, 242; 452/164, 149,
198

[56] References Cited

U.S. PATENT DOCUMENTS

| | | |
|---|---|---|
| 417,962 | 12/1889 | Whitney . |
| 781,985 | 2/1905 | Amon . |
| 931,295 | 8/1909 | Hagemeyer . |
| 1,069,580 | 8/1913 | Rose et al. . |
| 2,684,207 | 7/1954 | O'Brien . |
| 2,852,200 | 9/1958 | Holzer ................................. 241/92 |
| 3,480,213 | 11/1969 | Shelton, Jr. . |
| 3,528,617 | 9/1970 | Trevathan ............................. 241/92 |
| 3,552,663 | 1/1971 | Royals . |
| 3,946,117 | 3/1976 | Blair . |
| 4,074,389 | 2/1978 | Blair . |
| 4,245,373 | 1/1981 | Coroneos . |
| 4,298,621 | 11/1981 | Samis . |
| 4,360,166 | 11/1982 | Biersack . |
| 4,523,720 | 6/1985 | Behringer et al. ................. 241/92 X |
| 4,683,924 | 8/1987 | Cornelius . |
| 4,767,070 | 8/1988 | Nagao et al. . |
| 4,769,872 | 9/1988 | Hazenbroek . |

OTHER PUBLICATIONS

The Wulf "Grind All" Machine, Farmer Automatic of America, Inc.

*Primary Examiner*—Mark Rosenbaum
*Attorney, Agent, or Firm*—Connolly & Hutz

[57] ABSTRACT

A poultry pulverizer comprises a portable framework with a vertically oriented hopper secured thereto having an open top end and a lower end. A horizontally disposed shear wheel is positioned at the lower end of the hopper where it forms a bottom wall. The shear wheel has a downwardly extending vertical shaft journaled to the framework for rotation by a motivator that rotates the shaft and in turn the shear wheel. At least one cutter blade mounted on an upper surface of the shear wheel has a slightly raised cutting edge. A stationary anvil bar connected to and extending across the lower end of the hopper has an adjustable height slightly above the cutting edge of the cutter blade whereby poultry introduced into the hopper through the open top end drops by gravity to the lower end where it is pulverized by the shearing action of the rotating cutter blade and the stationary anvil bar. The pulverized poultry is discharged from the hopper through an opening in the shear wheel located adjacent to the cutter blade.

4 Claims, 3 Drawing Sheets

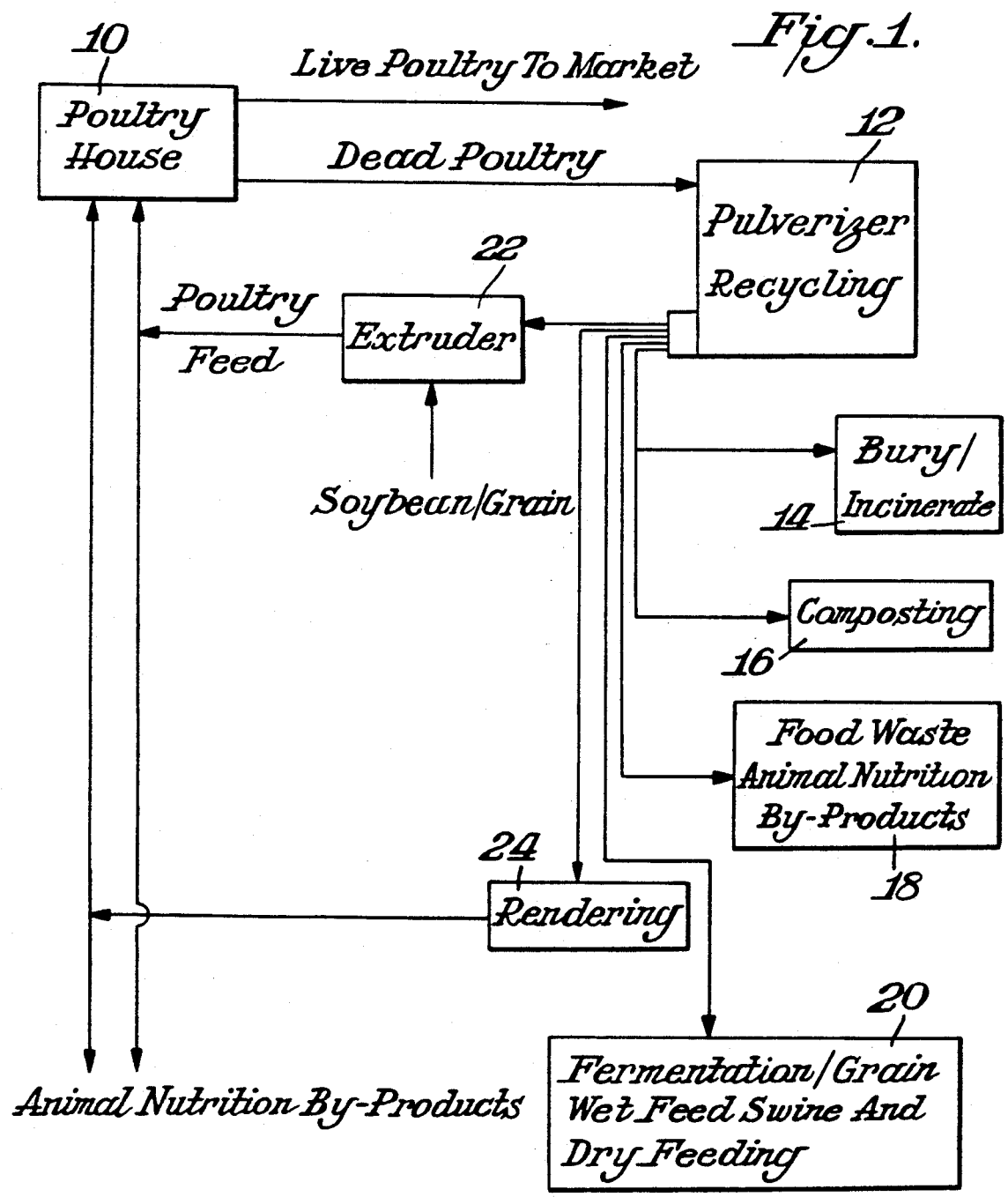

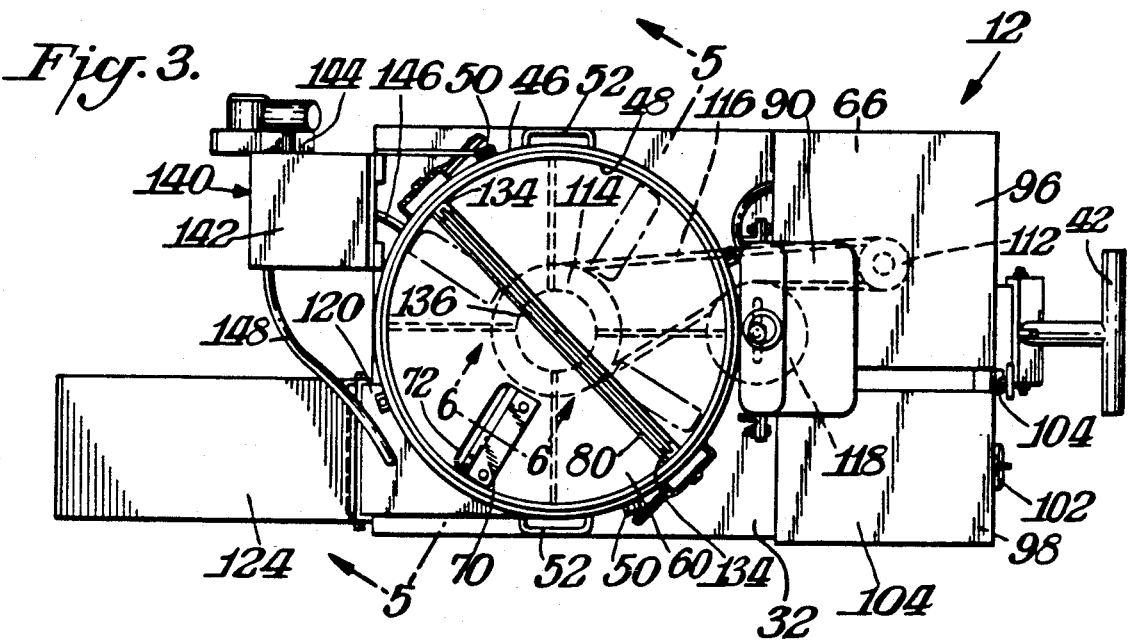
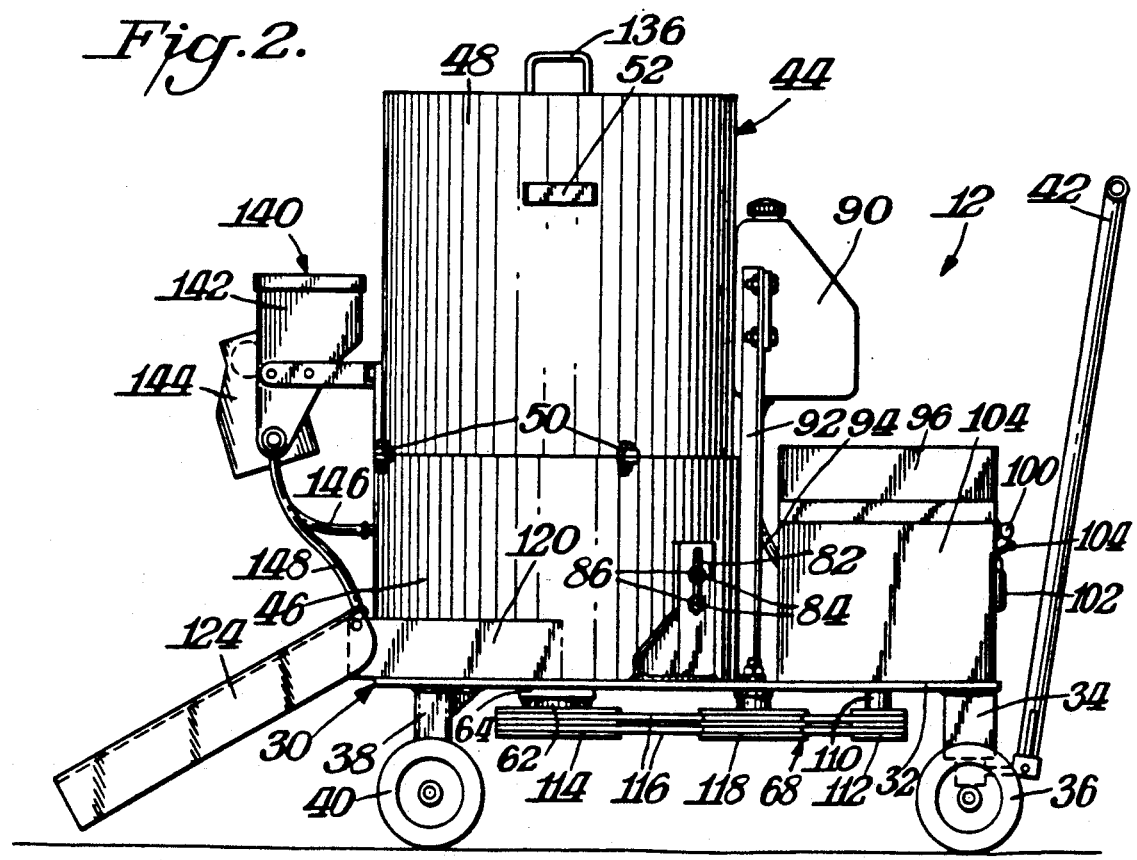

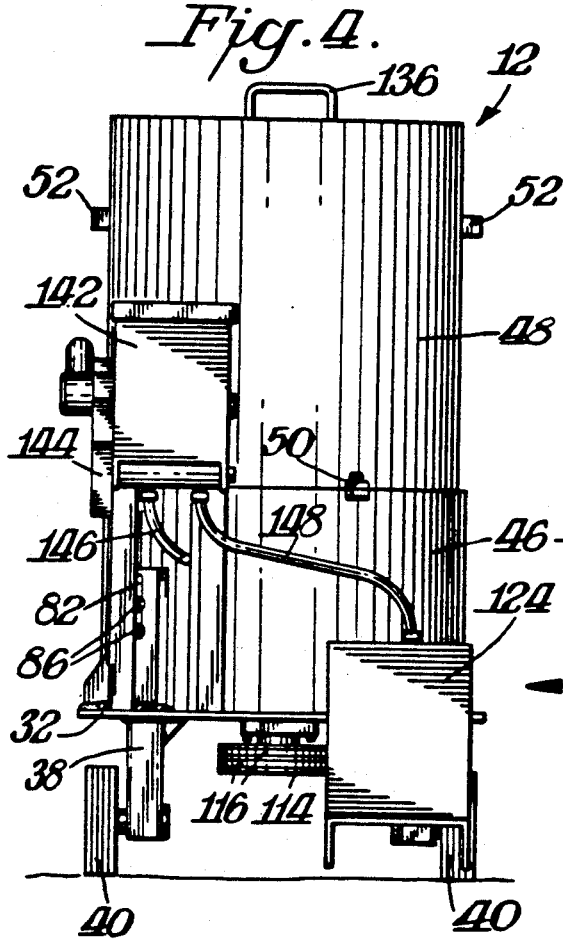
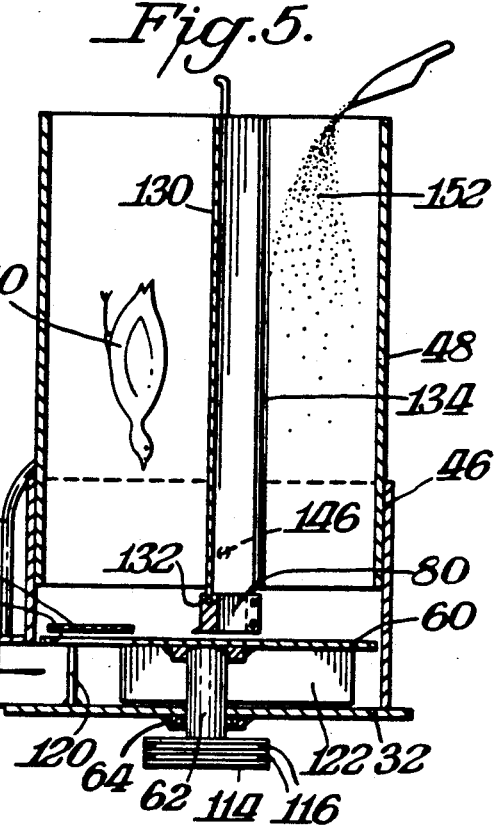
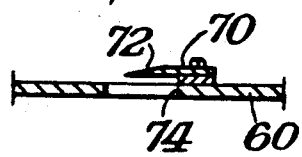

POULTRY PULVERIZER

BACKGROUND OF THE INVENTION

The present invention relates to poultry processing, and more particularly to the pulverization of dead poultry for disposal purposes, composting, feed production and the like.

In the raising of poultry such as chicken, for example, a small percentage are usually found unfit for shipment to market. These chickens may be contaminated by pathogenic organisms or toxic chemicals and thereby require disposal by deep burying, incineration, composting or rendering. Fermentation processes are also available as an initial step in the destruction of pathogenic organisms. Other dead birds may be disposed of and used in the production of animal nutrition by-products and other animal feeds. Regardless of which processing procedure is selected, prior comminuting of the poultry carcass is beneficial.

SUMMARY OF THE INVENTION

Accordingly, it is an object of the present invention to provide a poultry pulverizer for processing poultry in a highly efficient and beneficial manner whereby the pulverized poultry is most suitable for further processing in the production of animal feed, compost, or disposal by burying or incineration.

In accordance with the present invention, a poultry pulverizer comprises a portable framework with a vertically oriented hopper secured thereto having an open top end and a lower end. A horizontally disposed shear wheel is positioned at the lower end of the hopper where it forms a bottom wall. The shear wheel has a downwardly extending vertical shaft journaled to the framework for rotation by a motivator which functions to rotate the shaft and in turn the shear wheel. One or more cutter blades are mounted on an upper surface of the shear wheel and each blade has a slightly raised cutting edge. A stationary anvil bar connected to and extending across the lower end of the hopper has a height slightly above the cutting edge of each cutter blade. Poultry introduced into the hopper through the open top end drops by gravity to the bottom end where it is pulverized by the shearing action of each rotating cutter blade and the stationary anvil bar. The pulverized poultry is discharged from the hopper through an opening in the shear wheel located adjacent each cutter blade.

Preferably, the poultry pulverizer of the present invention includes vertical adjustment structure connecting the stationary anvil bar to the hopper for adjusting the vertical distance between the cutting edge of the cutter blade and the anvil bar. The vertical adjustment structure may comprise a pair of generally vertical slots oppostie one another in the lower end of the hopper and at least one externally threaded horizontal pin extending from each end of the anvil bar into and through the vertical slots in the hopper. Internally threaded fasteners on each pin function to fixedly secure the anvil bar to the hopper.

In the preferred embodiment of the present invention, the hopper of the poultry pulverizer includes a lower portion and a separate top portion which partially telescopes into the lower portion. Releasable fastening structure connects the two hopper portions together. Moreover, the lower portion of the hopper is fixedly secured to the framework and the separate top portion may be removed for ease of cleaning. Handles are positioned on the separate top portion of the hopper to facilitate removal thereof when the fastening structure is released.

Preferably the poultry pulverizer includes a vertically disposed partition wall in the hopper resting on the anvil bar and upwardly extending therefrom for dividing the hopper into two sections. The stationary anvil bar may include a slot therein extending along the upper surface thereof for snugly receiving the bottom edge of the partition wall. Additionally, the inside of the hopper may include a pair of brackets opposite one another, each with a slot therein vertically extending from the opposite ends of the anvil bar for snugly receiving opposite side edges of the partition wall.

Moreover, a discharge compartment may be positioned below the shear wheel for collecting pulverized poultry discharged through the opening in the wheel. A plurality of pusher paddles in the discharge compartment are secured to the shear wheel on the undersurface thereof for rotation with the wheel for pushing pulverized poultry out of the discharge compartment through an exit chute.

An inoculant and carbohydrate administration unit may be utilized to deliver such materials to the pulverized poultry. A first line connects a storage vessel to the hopper above the shear wheel while a second line connects the vessel to the exit chute of the discharge compartment.

BRIEF DESCRIPTION OF THE DRAWING

Novel features and advantages of the present invention in addition to those mentioned above will become apparent to those persons of ordinary skill in the art from a reading of the following detailed description in conjunction with the accompanying drawing wherein similar reference characters refer to similar parts and in which:

FIG. 1 is a flow diagram illustrating poultry processing that includes the pulverization and recycling of dead poultry;

FIG. 2 is a side elevational view of a poultry pulverizer, according to the present invention;

FIG. 3 is a top plan view of the poultry pulverizer shown in FIG. 2, according to the present invention;

FIG. 4 is an end elevational view of the poultry pulverizer shown in FIGS. 2 and 3, according to the present invention;

FIG. 5 is a sectional view taken along line 5—5 of FIG. 3; and

FIG. 6 is a partial sectional view taken along line 6—6 of FIG. 3.

DETAILED DESCRIPTION OF THE INVENTION

Referring in more particularity to the drawing, FIG. 1 diagramatically illustrates poultry raising processes wherein poultry raised in a poultry house 10 is delivered to market upon reaching maturity. Dead poultry is collected throughout the raising period and the carcasses are pulverized on a day-to-day basis for disposal purposes, composting, feed production and the like. The pulverizer 12 of the present invention, as explained in more detail below, functions to fulfill this important and beneficial step. After pulverization the poultry may be disposed of by deep burying or incineration at 14. Alternatively, the pulverized poultry may be composted at 16 or used to produce food waste animal nutrition by-products at 18. Another possibility is fermentation of the pulverized poultry with grain in the production of wet feed for swine and dry feeding at 20.

Additionally, the pulverized poultry may be mixed with soybean grain in an extruder 22 for the production of poultry feed some of which may be recycled to the growing house 10. Also, the pulverized poultry may be subjected to a rendering process at 24 and later used to produce animal nutrition by-products some of which may be recycled to the poultry growing house 10.

In each instance the poultry pulverizer 12 functions to pulverize the poultry as a preparatory step of a number of options available for the further processing of the poultry.

Poultry pulverizer 12 primarily comprises a portable framework 30 for transporting the pulverizer to locations where it is used. Basically, the framework includes a horizontal platform 32 with front support structure 34 for a pair of front wheels 36. Similar support structure 38 is provided at the rear of platform 32 for supporting a pair of rear wheels 40. Front wheels 36 pivot about a vertical axis for steering purposes in a manner well known in the art, and a handle 42 is provided to facilitate movement of the front wheels about that axis and also to move the framework from one place to the next.

A vertically oriented hopper 44 is secured to platform 32 of framework 30. The hopper is cylindrical in configuration having a wide open top end and a lower end. Preferably the hopper includes a lower portion 46 and a separate top portion 48 which telescopes into lower portion 46, as shown best in FIG. 5. Releasable fastening structure 50 spaced around the circumference of the hopper connects the two hopper portions together. The lower portion 46 of hopper 44 is secured to the framework 30 by welding to platform 32 or by other well known means. A pair of handles 52 are positioned on the outside of the separate top portion 48 of the hopper for removing and manipulating that portion when fastening structure 50 is released.

A horizontally disposed shear wheel 60 is positioned at the lower end of hopper 44 where it forms a bottom wall. The shear wheel has a downwardly extending vertical shaft 62 secured thereto and journaled at 64 to platform 32 of framework 30. Shear wheel 60 is rotated by an engine 66 connected to the wheel by a transmission 68, as explained more fully below. Shear wheel 60 includes one or more cutter blades 70 mounted on the upper surface of the wheel. As shown best in FIG. 6, each cutter blade 70 has a slightly raised cutting edge 72, and a discharge opening 74 is provided in the shear wheel directly below each cutter blade. As the poultry is pulverized it drops through the discharge openings below the cutter blades.

A stationary anvil bar 80 is connected to and extends across hopper 44 at the lower end thereof. Anvil bar 80 has a height slightly above the cutting edge 72 of each cutter blade 70. In actual use, poultry deposited in the hopper is pulverized by the shearing action of the cutter blades 70 against the stationary anvil bar 80.

The elevation of stationary anvil bar is adjustable for varying the vertical distance between the cutting edge 72 of each blade and the anvil bar. Such vertical adjustment structure may comprise a pair of generally vertical slots 82 opposite one another in lower portion of hopper 44. At least one and preferably two externally threaded horizontal pins 84 extend from each end of anvil bar 80 into and through the vertical slots 82 in the lower portion 46 of the hopper. Once the proper elevation of the anvil bar is obtained, internally threaded fasteners 86 are placed on each pin 84 to fixedly secure the anvil bar to the hopper at that elevation.

Engine 66 for rotating the shear wheel may be a 12 or 18 horsepower electric start, gasline powered type. A fuel tank 90 mounted on a bracket 92 secured to framework 30 is utilized to supply gasoline to the engine 66 via a fuel line 94. The engine may be enclosed in a housing 96 and a battery 98 is positioned next to the engine for starting purposes. A key-start 100 and an amp meter 102 are positioned on the front of a battery box 104 enclosing battery 98. The engine also includes a conventional throttle and choke mechanism 104.

The vertical drive shaft 110 of engine 66 has a double sheath pulley 112 connected thereto. Similarly, the vertical shaft 62 of the shear wheel has a double sheath pulley 114 connected to it. Dual belting 116 is trained around these pulleys whereby activation of engine 66 functions to rotate the shear wheel. A tensioning wheel 118 may be provided to apply proper tension to belting 116, as is well known.

A discharge compartment 120 is located below the shear wheel 60 for receiving pulverized poultry discharged from the hopper through the one or more openings 74 in the shear wheel. A plurality of pusher paddles 122 are located within the discharge compartment, each of the pusher paddles being secured to the underside of the shear wheel for rotation with the wheel. Preferably, the pusher paddles radiate outwardly from the center of the wheel. The discharge compartment includes an exit chute 124 and the rotating pusher paddles function to force the pulverized poultry out of the compartment through the discharge chute.

A vertically disposed partition wall 130 is located in the hopper for dividing the hopper into multiple sections. Basically, the partition wall rests on anvil bar 80 and extends upwardly therefrom. Preferably, the anvil bar includes a slot 132 therein which extends along the upper surface of the bar for snugly receiving the bottom edge of the partition wall, as shown best in FIG. 5. Additionally, the interior of the hopper includes an opposite pair of slot defining brackets 134 which vertically extend from opposite ends of the anvil bar, as shown best in FIG. 3. The vertical slots in the brackets 134 snugly receive opposite side edges of the partition wall. Partition wall 130 has a handle 136.

Poultry pulverizer 12 also includes an inoculant and carbohydrate administration unit 140 for introducing inoculant and carbohydrate into the pulverized poultry. The carbohydrate provides a food source which promotes healthier and faster growth of the inoculant which enhances faster fermentation of the pulverized poultry. Basically, unit 140 includes a storage vessel 142, a metering device 144, and several lines 146, 148 which connect the vessel via metering device 144 to the hopper above the shear wheel and also to the exit chute 124 of the discharging compartment. Hence, these materials may be incorporated in the pulverized poultry at either one or both of these locations at preselected quantities.

With the engine running and the shear wheel rotating, dead poultry carcasses 150 are simply dropped into the wide open end of hopper 44 onto the one or more cutter blades 70 at the bottom of the hopper. The poultry is immediately pulverized by the shearing action of the rotating cutter blades against stationary anvil bar 80, and the pulverized poultry is discharged from the hopper into the discharge compartment 120 through openings 74 in the wheel. The paddles 122 in the compartment push the poultry out and away from the pulverizer through the discharge chute 124.

Grain 152 may be introduced into the hopper on the other side of partition wall 130 for mixing with poultry as it is pulverized. Also, the inoculant and carbohydrate administration unit 140 may be used to introduce these materials into the pulverized poultry.

What is claimed is:

1. A poultry pulverizer comprising a portable framework, a vertically oriented hopper secured to the framework having an open top end and a lower end, a horizontally disposed shear wheel at the lower end of the hopper forming a bottom wall of the hopper, the shear wheel having a downwardly extending vertical shaft secured thereto journaled to the framework for rotation, motivator means for rotating the shaft and the shear wheel, at least one cutter blade mounted on an upper surface of the shear wheel having a slightly raised horizontally disposed cutting edge, a discharge opening in the shear wheel adjacent the cutter blade, and a horizontally disposed stationary anvil bar connected to and extending across the hopper at the lower end thereof having a height slightly above the cutting edge of the cutter blade, the stationary anvil bar and the cutter blade cooperating with one another to form shear means whereby poultry introduced into the hopper through the open top and drops by gravity to the lower end where it is pulverized by the shearing action of the shear means formed by the rotating cutter blade and the stationary anvil bar, and discharged from the hopper through the opening in the shear wheel, and vertical adjustment means connecting the stationary anvil bar to the hopper for adjusting the vertical distance between the cutting edge of the cutting blade and the anvil bar, and wherein the vertical adjustment means comprises a pair of generally vertical slots opposite one another in the lower end of the hopper, at least one externally threaded horizontal pin extending from each end of the anvil bar into and through the vertical slots in the hopper, and internally threaded fasteners on each pin fixedly securing the anvil bar to the hopper.

2. A poultry pulverizer comprising a portable framework, a vertically oriented hopper secured to the framework having an open top end and a lower end, a horizontally disposed shear wheel at the lower end of the hopper forming a bottom wall of the hopper, the shear wheel having a downwardly extending vertical shaft secured thereto journaled to the framework for rotation, motivator means for rotating the shaft and the shear wheel, at least one cutter blade mounted on an upper surface of the shear wheel having a slightly raised horizontally disposed cutting edge, a discharge opening in the shear wheel adjacent the cutter blade, and a horizontally disposed stationary anvil bar connected to and extending across the hopper at the lower end thereof having a height slightly above the cutting edge of the cutter blade, the stationary anvil bar and the cutter blade cooperating with one another to form shear means whereby poultry introduced into the hopper through the open top end drops by gravity to the lower end where it is pulverized by the shearing action of the shear means formed by the rotating cutter blade and the stationary anvil bar, and discharged from the hopper through the opening in the shear wheel, and a vertically disposed partition wall in the hopper resting on the anvil bar and upwardly extending therefrom for dividing the hopper into two sections.

3. A poultry pulverizer as in claim 2 wherein the stationary anvil bar includes a slot therein extending along an upper surface thereof for snugly receiving a bottom edge of the partition wall.

4. A poultry pulverizer as in claim 3 including an opposite pair of slot defining means on the inside of the hopper vertically extending from opposite ends of the anvil bar for snugly receiving opposite side edges of the partition wall.

* * * * *